United States Patent [19]

Poll

[11] 4,101,641

[45] Jul. 18, 1978

[54] PROCESS FOR THE REMOVAL OF SULPHUR OXIDES FROM GASES

[75] Inventor: Ian Poll, Amsterdam, Netherlands

[73] Assignee: Shell Oil Company, Houston, Tex.

[21] Appl. No.: 801,262

[22] Filed: May 27, 1977

[30] Foreign Application Priority Data

May 28, 1976 [NL] Netherlands .......................... 7605736

[51] Int. Cl.² ............................................. C01B 17/04
[52] U.S. Cl. ................................. 423/567 R; 423/228; 423/570
[58] Field of Search ............... 423/228, 224, 567, 570, 423/574, 576; 55/73

[56] References Cited

U.S. PATENT DOCUMENTS

| | | | |
|---|---|---|---|
| 1,919,342 | 7/1933 | Merriam | 423/570 |
| 3,848,071 | 11/1974 | Groenendaal et al. | 423/570 X |
| 3,851,050 | 11/1974 | Groenendaal et al. | 423/244 X |
| 3,965,244 | 6/1976 | Sykes | 423/228 |

FOREIGN PATENT DOCUMENTS 1,444,127  7/1976  United Kingdom.

*Primary Examiner*—G. O. Peters

[57] ABSTRACT

A process for the cyclic removal of sulphur oxides from gases in which the regeneration offgas containing sulphur oxides is partially combusted to produce a reducing gas and elemental sulphur.

5 Claims, 1 Drawing Figure

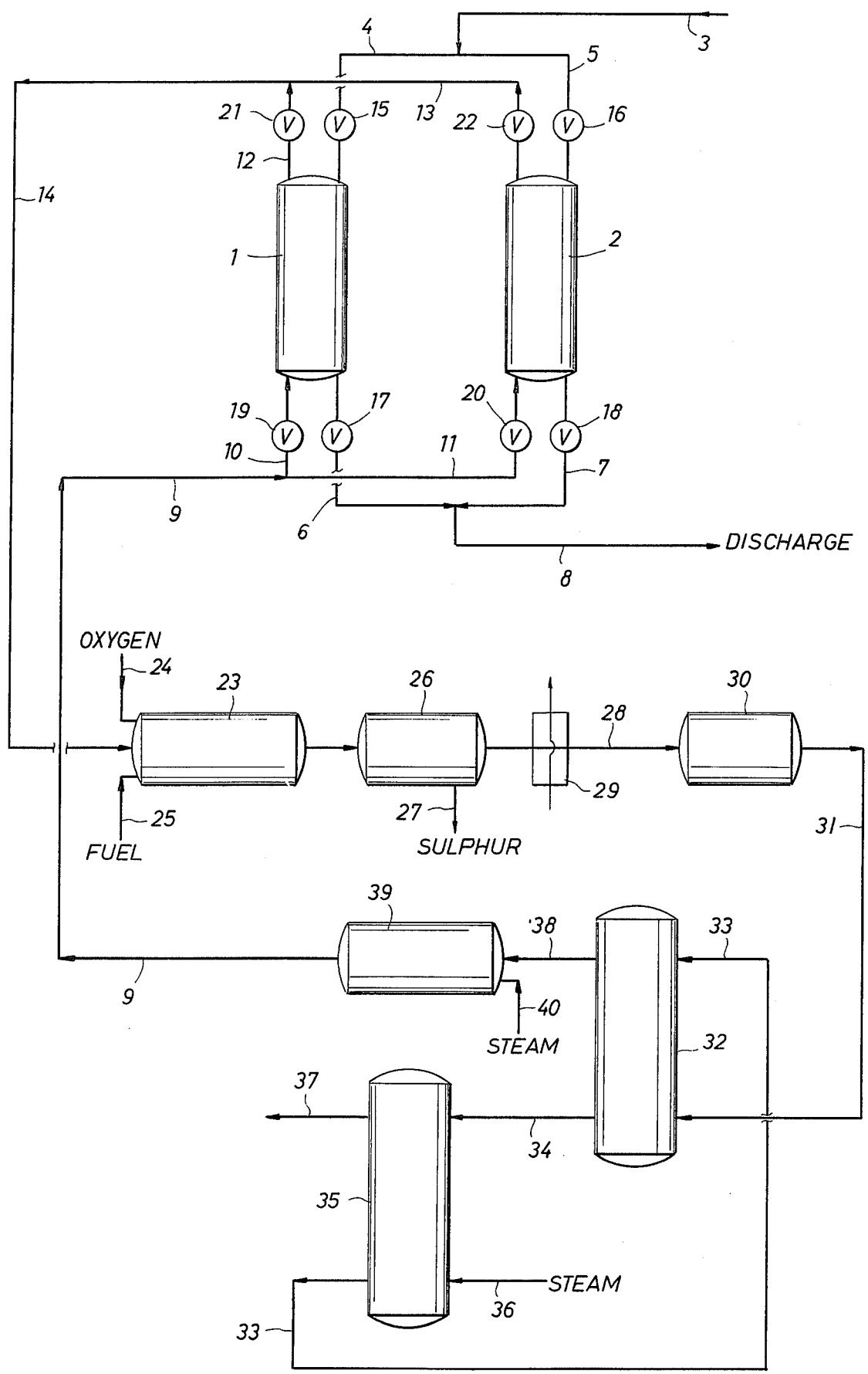

PROCESS FOR THE REMOVAL OF SULPHUR OXIDES FROM GASES

BACKGROUND OF THE INVENTION

Numerous processes have been proposed for the removal of sulphur oxides from industrial offgases. Most such processes provide for desulphurization of the gases with subsequent discharge of the gases via a stack. To ensure sufficient lift in and above the stack, the gases must have a temperature of at least 200° C after desulphurization.

A drawback of processes in which the sulphur oxides are absorbed in a solvent is that the non-absorbed gases must be heated after desulphurization. It has therefore been proposed to pass the gases containing the sulphur oxides at higher temperatures over acceptors on which the sulphur oxides are accepted. The gases then give up their sulphur oxides at a temperature desirable for the stack and the offgases can be discharged directly.

In some processes, the acceptor loaded with sulphur oxides is not regenerated, and in other processes it is. In the latter case, the acceptor can be used again for accepting sulphur oxides.

The present invention relates to the latter type of process, and particularly to a process in which the loaded acceptor is regenerated with a reducing gas. In the regeneration of the loaded acceptor, the process produces a regeneration offgas containing, besides converted and unconverted compounds from the reducing gas, also sulphur compounds. Depending on the conditions chosen for the process, such as reducing capacity of the reducing gas, the regeneration offgas will contain $SO_2$, $SO_3$, $H_2S$, COS, $CS_2$ and similar sulphur compounds in various proportions.

These sulphur compounds must be rendered harmless, and they are usually converted into elemental sulphur. However, this conversion is expensive and laborious, particularly when the concentration of sulphur compounds in the regeneration offgas is not high. Another problem is that the regeneration offgas still contains a quantity of reducing components that cannot easily be utilized.

The present invention aims at obviating these drawbacks.

SUMMARY OF THE INVENTION

Accordingly, the invention comprises a process for the removal of sulphur oxides from a gas with the aid of a solid acceptor which accepts the sulphur oxides, the loaded acceptor subsequently being regenerated with a reducing gas, and in which elemental sulphur is prepared from the regeneration offgas containing sulphur compounds, the process being characterized by an efficient manner of production of the elemental sulphur and reducing gas. In particular, the method is characterized by feeding the regeneration offgas to a generator for the reducing gas in which a fuel is partially combusted with the sulphur compounds and oxygen to a reducing gas containing hydrogen, carbon monoxide, and elemental sulphur, and recovering the sulphur from the reducing gas and utilizing the reducing gas for regeneration of the loaded acceptor.

According to the invention, the regeneration offgas is fed to a generator for the reducing gas, in which generator a fuel is made to react with the sulphur compounds and oxygen to form, inter alia, hydrogen, carbon monoxide and elemental sulphur, after which the sulphur is recovered from the reducing gas and this reducing gas is used for the regeneration of loaded acceptor. A great advantage of the invention is that after removal of the elemental sulphur and of the remaining sulphur compounds, a gas is obtained which is suitable for regeneration of the loaded acceptor.

Partial combustion generally takes place in a reactor lined with firebricks. The fuel and the air or oxygen required for the combustion are fed to the reactor via a burner, and the gases formed are removed from the reactor after a short residence time. The regeneration offgas may be fed to such a reactor via the burner separately or mixed with the fuel or oxygen.

In the generator for reducing gas, for instance in the form of the aforementioned reactor, thermal conversion of the sulphur compounds takes place is a (strongly) reducing atmosphere and at a high temperature. The yield of elemental sulphur will be greatly dependent on the conditions chosen and amount to, for instance, 20–80% of the bound sulphur present. The sulphur formed can be removed from the reducing gas originating from the generator by condensation. The requirements of the acceptance process will determine whether or not the sulphur compounds left in the reducing gas after removal of the sulphur have to be removed before the gas is used for regenerating the loaded acceptor.

If these sulphur compounds have to be removed, the generator for reducing gas is preferably operated in such a way that the sulphur compounds that have not been converted into elemental sulphur are converted into hydrogen sulphide to the largest possible extent. According to the invention, this hydrogen sulphide is then preferably removed from the reducing gas by absorption in a solvent. In that case the invention produces an additional advantage: even in cases where no sulphur compounds are allowed in the gas to be used for regenerating the acceptor, the reducing-gas generator can still be operated using a (relatively cheap) sulphur-containing fuel, without high additional costs being involved.

Apart from sulphur and hydrogen sulphide, relatively small quantities of other sulphur compounds may be formed in the generator. Small percentages of COS and $CS_2$ may be formed and these compounds can subsequently be catalytically converted into $H_2S$ outside the generator prior to the removal of hydrogen sulphide. This will ensure that no build-up of COS and $CS_2$ occurs in the reducing gas, which in fact is recirculating.

In some acceptance processes for the removal of sulphur oxides from gases, the presence of high percentage of carbon monoxide in the reducing gas used in the regeneration of the loaded acceptor is undesirable. In this case, according to the invention, preferably at least part of the carbon monoxide in the reducing gas is catalytically converted with steam. This will produce, apart from carbon dioxide, additional hydrogen.

Under certain conditions there may be some $CO_2$ in the reducing gas, for instance, as a result of the catalytic CO conversion just mentioned. According to the invention at least part of this $CO_2$ may be removed from the reducing gas by absorption in a solvent.

It is preferred, according to the invention, to prepare a reducing gas containing more than 50% of steam, part of which is added after desulphurization of the reducing gas. In the above-mentioned generator some steam will always be formed; it may also be advantageous to feed some steam to the generator. In the catalytic conversion of CO, COS, and $CS_2$ the presence of steam is desirable.

In the removal of elemental sulphur by condensation and in the removal of hydrogen sulphide by absorption, however, the presence of much steam is undesirable. Some acceptance processes, however, require the presence of a large quantity of inert diluent, such as steam, during the regeneration. Therefore, a considerable part of the steam is preferably added to the reducing gas only at the last moment.

According to a preferred embodiment of the invention, an acceptor is used in which the active component is copper and/or copper oxide supported on a ceramic carrier, and the acceptance of sulphur oxides and the regeneration of loaded acceptor is effected at temperatures between 200° and 450° C. This manner of accepting sulphur oxides requires that for the regeneration of loaded acceptor a reducing gas be used which can be readily prepared in the manner according to the invention and it yields a regeneration offgas which can also be desulphurized in the manner according to the invention.

DETAILED DESCRIPTION OF THE INVENTION

The invention will be further elucidated hereinafter with reference to the attached drawing.

The drawing is a scheme of a process according to a preferred embodiment of the invention.

The FIGURE shows two reactors designated 1 and 2 in which there is a solid acceptor for sulphur oxides. Connected to reactors 1 and 2 are two pipeline systems, viz. a system of flue gas lines and a system of regeneration gas lines. Flue gas main supply line 3 splits up to form lines 4 and 5, which lead to reactors 1 and 2, respectively. The two lines 6 and 7 connect reactors 1 and 2, respectively, to flue gas main discharge line 8. Regeneration gas supply line 9 splits up to form lines 10 and 11, which lead to reactors 1 and 2, respectively. The two lines 12 and 13 run from reactors 1 and 2, respectively, to regeneration gas discharge line 14.

Reactors 1 and 2 are used as follows in the removal of sulphur oxides. Flue gas, originating from, for instance, an industrial furnace in which sulphur-containing fuel is fired, is passed via line 3 through one of the two reactors 1 or 2. To this end a valve 15 in line 4 or a valve 16 in line 5 is open, depending on whether reactor 1 or reactor 2 is in service for flue gas desulphurization. Valve 17 or 18, in line 6 or line 7, respectively, is open as well.

The two valves belonging to the other reactor are closed. After being passed through reactor 1 or 2, the flue gas is discharged via line 8, for example, to a stack.

Simultaneously, the reactor through which flue gas is not being passed is regenerated with regeneration gas, which is supplied to the reactor concerned via line 9. As indicated, the regeneration gas is discharged from the reactor via line 14. Of the reactor concerned, valve 19 or 20 in line 10 or 11 and valve 21 or 22 in line 12 or 13 are open, the corresponding valves belonging to the other reactor being closed.

After some time the flue gas in line 3 will have given up such a quantity of sulphur oxides to the acceptor in the reactor to which the flue gas is supplied that regeneration becomes necessary. The closed valves of the two reactors are then opened and the open valves are closed, so that the functions of the two reactors interchange.

As can be seen from the foregoing, the regeneration offgas, which contains sulphur compounds, is discharged via line 14. It is then conveyed direct to reactor 23, which is lined with firebrick and consists of a combustion space. The regeneration offgas is fed into this space via a burner, oxygen is supplied via line 24, and carbonaceous fuel is supplied via line 25. A substoichiometric quantity of oxygen is used. In addition to hydrogen and carbon monoxide, sulphur and hydrogen sulphide are also formed in reactor 23.

In the condensing unit 26, elemental sulphur is separated from the reaction products by condensation. The sulphur is discharged via line 27, and the sulphur-free gases via line 28 through preheater 29 wherein they are heated.

The COS and $CS_2$ present in the gas are converted into $H_2S$ in reactor 30 over a catalyst containing cobalt and molybdenum. The gas is then fed via line 31 to the bottom of an absorption column 32. As the gas rises in this column it is washed with a solvent descending via trays, which solvent is supplied via line 33. The solvent consists of an aqueous solution of an alkanolamine, such as methyldiethylamine or diisopropylamine. The solvent removes all $H_2S$ and part of the $CO_2$ from the gas and is subsequently discharged at the bottom of column 32 via line 34.

This loaded solvent is subsequently regenerated by steam stripping in a stripping column 35, into which it is introduced at the top, whereas the steam is supplied to the column at the bottom via line 36. As steam and solvent move through the column counter-currently, the solvent gives up the dissolved gases. Regenerated solvent is discharged at the bottom of the column via line 33 recirculated to column 32. Steam containing $CO_2$ and $H_2S$ is discharged at the top of column 35 via line 37 and may be processed in a Claus unit not shown.

The reducing gas, stripped of $H_2S$ and partly of $CO_2$, which is discharged from the top of column 32 via line 38 is subsequently passed through a reactor 39, where a catalytic conversion of carbon monoxide with steam into hydrogen and carbon dioxide takes place. To this end additional steam is added to the gas via line 40.

The gas issuing from reactor 39 is suitable to be used as regeneration gas and is passed via line 9 to reactor 1 or 2.

The invention will be elucidated with reference to the following calculated illustration.

With the aid of equipment built in accordance with the drawing, a flue gas is desulphurized, i.e. the $SO_2$-loaded flue gas was supplied via line 3, the $SO_2$ being removed from it alternately in reactors 1 and 2, the desulphurized flue gas being discharged via line 8.

In the regeneration of the loaded acceptor a mixture of hydrogen, carbon dioxide and vapor is passed through reactor 1 or 2 at about 400° C. The mixture contains approximately 60.7%m $H_2$, 33.2%m $CO_2$ and 6.1%m $H_2O$. At the beginning of the regeneration the acceptor is loaded with 0.6 mole $SO_2$ per mole Cu. The regeneration offgas, which is discharged via line 14 at about 400° C, contains on an average approximately 20.2%m $SO_2$, 52.9%m $H_2O$ and 26.9%m $CO_2$.

This regeneration offgas is conveyed to reactor 23, as is also a flow of oxygen and flow of methane (both at 20° C). Approximately 1.23 mole $O_2$, and 1.86 mole $CH_4$, per mole of $SO_2$, are introduced into reactor 23. Reactor 23 is operated at a flame temperature of about 1225° C. The product gas is discharged from the reactor containing approximately 47.8%m $H_2O$, 18.7%m $CO_2$, 13.6%m CO, 11.2%m $H_2$. 6.0%m $H_2S$, 1.7%m $S_2$, 0.4%m $SO_2$, 0.3%m COS and 0.1%m $CS_2$.

Elemental sulphur is removed at a temperature of about 140° C by condensation in apparatus 26, and COS and $CS_2$ are converted at about 220° C in reactor 30. The gas thus contains about 45.8%m $H_2O$, 21.8%m $CO_2$, 13.8%m CO, 11.4%m $H_2$, 6.5%m $H_2S$ and 0.4%m $SO_2$. $H_2S$ and $CO_2$ are removed from the gas in absorption column 32. The gas fed to CO conversion reactor 39 contains approximately 54.7%m CO and 45.3%m $H_2$. In addition, 1.18 mole $H_2O$ per mole CO is added. Reactor 39 contains a cobalt/molybdenum-on-alumina catalyst and is operated at an average temperature of 200° C. The gas issuing from the reactor is fed to reactor 1 or 2 via line 9.

The mixture of $H_2S$ and $CO_2$ discharged from stripping column 35 via line 37 is further processed into elemental sulphur in a conventional Claus unit.

What is claimed is:

1. In a process for the removal of sulphur oxides from a gas with the aid of a solid acceptor which accepts the sulphur oxides, the loaded acceptor subsequently being regenerated with reducing gas, and in which elemental sulphur is prepared from the regeneration offgas containing sulphur compounds, the improvement comprising preparing the elemental sulphur by feeding the regeneration offgas to a generator for the reducing gas in which a fuel is partially combusted with the sulphur compounds and oxygen to form a reducing gas containing hydrogen, carbon monoxide, and elemental sulphur, after which the sulphur is recovered from the reducing gas, and the reducing gas is used for the regeneration of the loaded acceptor.

2. The process of claim 1 wherein hydrogen sulphide is also formed in the generator, and this hydrogen sulphide is removed from the reducing gas by absorption of the hydrogen sulphide in a solvent.

3. The process of claim 2 in which COS and $CS_2$ are also formed in the generator and both are catalytically converted into hydrogen sulphide prior to the removal of hydrogen sulphide from the reducing gas obtained.

4. The process of claim 3 wherein at least part of the carbon monoxide in the reducing gas is catalytically converted with steam.

5. The process of claim 4 wherein an acceptor is used in which the active component is copper and/or copper oxide supported on a ceramic carrier, and the acceptance of sulphur oxides and the regeneration of loaded acceptor is effected at temperatures between 200° and 450° C.

* * * * *